(12) United States Patent
Panda et al.

(10) Patent No.: US 10,319,377 B2
(45) Date of Patent: Jun. 11, 2019

(54) METHOD AND SYSTEM OF ESTIMATING CLEAN SPEECH PARAMETERS FROM NOISY SPEECH PARAMETERS

(71) Applicant: Tata Consultancy Services Limited, Mumbai (IN)

(72) Inventors: Ashish Panda, Thane (IN); Sunil Kumar Kopparapu, Thane (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 15/444,759

(22) Filed: Feb. 28, 2017

(65) Prior Publication Data
US 2017/0270952 A1 Sep. 21, 2017

(30) Foreign Application Priority Data
Mar. 15, 2016 (IN) .............................. 201621009058

(51) Int. Cl.
*G10L 15/20* (2006.01)
*G10L 15/02* (2006.01)
*G10L 17/02* (2013.01)
*G10L 17/20* (2013.01)
*G10L 21/0208* (2013.01)

(52) U.S. Cl.
CPC .............. *G10L 15/20* (2013.01); *G10L 15/02* (2013.01); *G10L 17/02* (2013.01); *G10L 17/20* (2013.01); *G10L 21/0208* (2013.01)

(58) Field of Classification Search
CPC ..... G10L 15/20; G10L 21/0208; G10L 15/02; G10L 25/93; G10L 21/0216; G10L 15/063; G10L 25/60; G10L 25/84
See application file for complete search history.

(56) References Cited

U.S. PATENT DOCUMENTS

| 6,202,047 | B1 | 3/2001 | Ephraim et al. |
| 6,633,842 | B1 * | 10/2003 | Gong ...................... G10L 15/20 704/233 |
| 8,433,472 | B2 | 4/2013 | Singh et al. |
| 8,639,502 | B1 * | 1/2014 | Boucheron ............. G10L 21/02 381/94.1 |
| 2005/0114124 | A1 * | 5/2005 | Liu ...................... G10L 21/0208 704/228 |
| 2005/0185813 | A1 * | 8/2005 | Sinclair ............... G10L 21/0208 381/380 |
| 2008/0010065 | A1 * | 1/2008 | Bratt .................... G06K 9/6222 704/246 |
| 2010/0262423 | A1 * | 10/2010 | Huo ........................ G10L 15/20 704/233 |

OTHER PUBLICATIONS

Ashish Panda, "Psychoacoustic Model Compensation with Robust Feature Set for Speaker Verification in Additive Noise", 2014, IEEE, pp. 629-632.*

* cited by examiner

*Primary Examiner* — Richemond Dorvil
*Assistant Examiner* — Mark Villena
(74) *Attorney, Agent, or Firm* — Finnegan, Henderson, Farabow, Garrett & Dunner LLP

(57) ABSTRACT

A method and system is provided for estimating clean speech parameters from noisy speech parameters. The method is performed by acquiring speech signals, estimating noise from the acquired speech signals, computing speech features from the acquired speech signals, estimating model parameters from the computed speech features and estimating clean parameters from the estimated noise and the estimated model parameters.

13 Claims, 2 Drawing Sheets

METHOD AND SYSTEM OF ESTIMATING CLEAN SPEECH PARAMETERS FROM NOISY SPEECH PARAMETERS

PRIORITY CLAIM

This U.S. patent application claims priority under 35 U.S.C. § 119 to: India Application No. 201621009058, filed on Mar. 15, 2016. The entire contents of the aforementioned application are incorporated herein by reference.

TECHNICAL FIELD

This disclosure relates generally to speech recognition, and more particularly to a method and system of estimating clean speech parameters from noisy speech parameters.

BACKGROUND

Speaker and speech recognition systems are becoming more and more ubiquitous, with applications ranging from access control to automated inquiry systems. The characteristics of a speaker and speech are represented by feature vectors derived from a speech utterance. Models trained on these feature vectors are then derived to serve as the template of a speaker or a speech unit. During the recognition phase, feature vectors derived from a test utterance is matched against the speaker or speech unit models and a match score is computed. The speech utterances used for training a model constitute the set of training speech. Often, one has access to only training speech corrupted with additive noise. Such training speech give rise to noisy and spurious models, which degrade the performance of the speaker and speech recognition systems.

Prior art talk about estimating clean speech vectors and corruption models which are slower in nature. Estimating clean model parameters is faster than estimating clean speech vectors as model parameters are less in number as compared to the vectors. Thereby, estimating clean speech parameters from noisy speech parameters with less computational complexity than estimating clean speech vectors for more effective speaker or speech recognition is still considered to be one of the biggest challenges of the technical field.

SUMMARY

Before the present methods, systems, and hardware enablement are described, it is to be understood that this invention is not limited to the particular systems, and methodologies described, as there can be multiple possible embodiments of the present invention which are not expressly illustrated in the present disclosure. It is also to be understood that the terminology used in the description is for the purpose of describing the particular versions or embodiments only, and is not intended to limit the scope of the present invention which will be limited only by the appended claims.

The present disclosure envisages a method and system which can estimate clean speech parameters from noisy speech parameters.

In an embodiment of the invention, a method of estimating clean speech parameters from noisy speech parameters is provided. The method comprises processor implemented steps of acquiring speech signals using a speech acquisition module (202), estimating noise from the acquired speech signals using a noise estimation module (204), computing speech features from the acquired speech signals using a feature extraction module (206), estimating model parameters from the computed speech features using a parameter estimation module (208) and estimating clean parameters from the estimated noise and the estimated model parameters using a clean parameter estimation module (210).

In another embodiment of the invention, a system for estimating clean speech parameters from noisy speech parameters is provided. The system comprises of a processor, a data bus coupled to the processor and a computer-usable medium embodying computer code, wherein the computer-usable medium is coupled to the data bus and the computer program code comprising instructions executable by said processor and configured for operating a speech acquisition module (202) adapted for acquiring speech signals, a noise estimation module (204) adapted for estimating noise from the acquired speech signals, a feature extraction module (206) adapted for computing speech features from the acquired speech signals, a parameter estimation module (208) adapted for estimating model parameters from the computed speech features and a clean parameter estimation module (210) adapted for estimating clean parameters from the estimated noise and the estimated model parameters.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
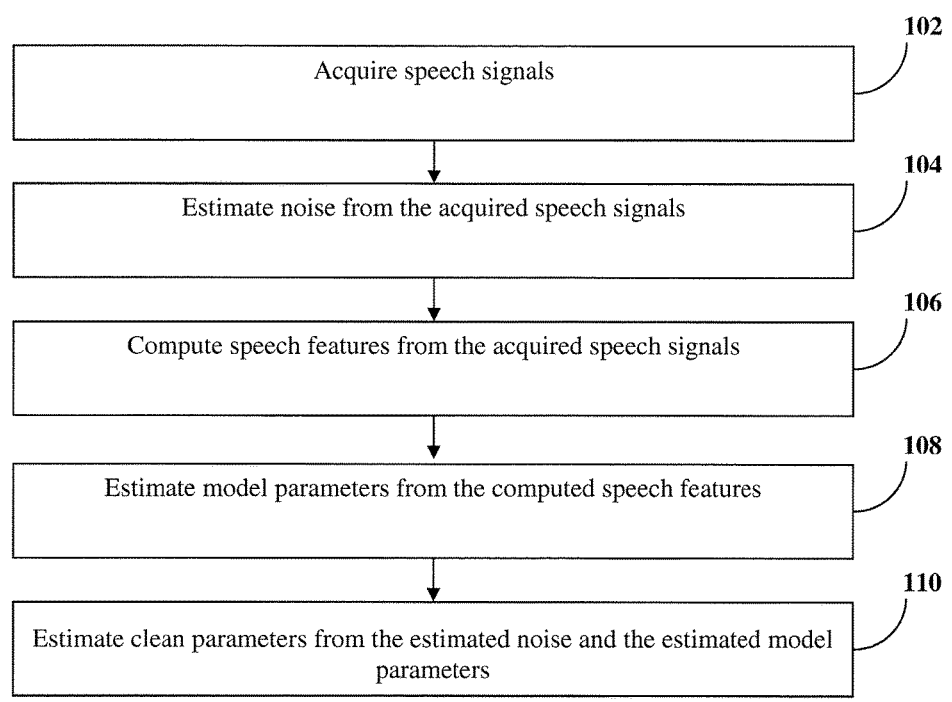
FIG. 1 shows a flow chart illustrating method for estimating clean speech parameters from noisy speech parameters.

Some embodiments of this invention, illustrating all its features, will now be discussed in detail.

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present invention, the preferred, systems and methods are now described. In the following description for the purpose of explanation and understanding reference has been made to numerous embodiments for which the intent is not to limit the scope of the invention.

One or more components of the invention are described as module for the understanding of the specification. For example, a module may include self-contained component in a hardware circuit comprising of logical gate, semiconductor device, integrated circuits or any other discrete component. The module may also be a part of any software programme executed by any hardware entity for example processor. The implementation of module as a software programme may include a set of logical instructions to be executed by a processor or any other hardware entity.

The disclosed embodiments are merely exemplary of the invention, which may be embodied in various forms.

The elements illustrated in the Figures interoperate as explained in more detail below. Before setting forth the detailed explanation, however, it is noted that all of the discussion below, regardless of the particular implementation being described, is exemplary in nature, rather than limiting. For example, although selected aspects, features, or components of the implementations are depicted as being stored in memories, all or part of the systems and methods consistent with the natural disaster prediction system and method may be stored on, distributed across, or read from other machine-readable media.

Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk.

The present disclosure provides a computer implemented method and system of estimating clean speech parameters from noisy speech parameters.

The present disclosure envisages the system which can estimate clean speech parameters from noisy speech parameters based the estimation of prevalent noise and psychoacoustic corruption function.

Referring to FIG. 1, it is a flow chart illustrating method of estimating clean speech parameters from noisy speech parameters The process starts at step 102, speech signals are acquired. At step 104, noise from the acquired speech signals is estimated. At step 106, speech features are computed from the acquired speech signals. At step 108, model parameters are estimated from the computed speech features. The process ends at step 110, clean parameters are estimated from the estimated noise and the estimated model parameters.

Figure 2:
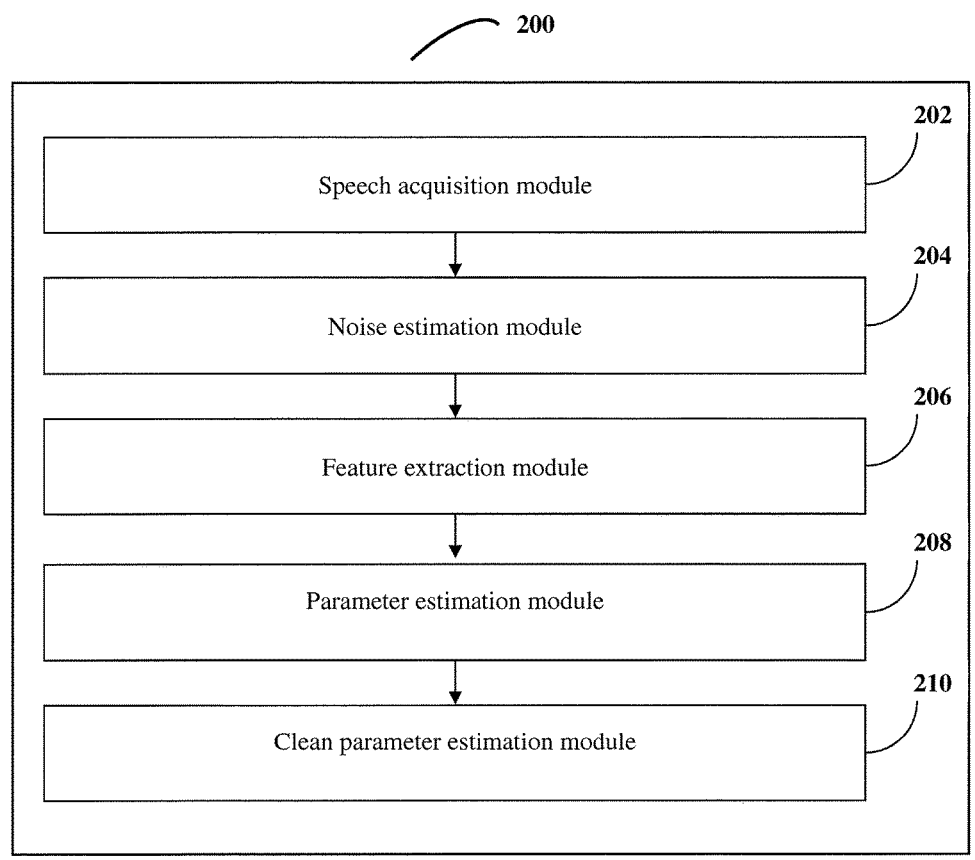
FIG. 2 shows a block diagram of a system for estimating clean speech parameters from noisy speech parameters.

Referring to FIG. 2, it is a block diagram of a system for estimating clean speech parameters from noisy speech parameters. The system (200) comprises of a speech acquisition module (202), a noise estimation module (204), a feature extraction module (206), a parameter estimation module (208) and a clean parameter estimation module (210).

According to an embodiment of the invention, the method of estimating clean speech parameters from noisy speech parameters comprises of acquiring speech signals using a speech acquisition module (202), estimating noise from the acquired speech signals using a noise estimation module (204), computing speech features from the acquired speech signals using a feature extraction module (206), estimating model parameters from the computed speech features using a parameter estimation module (208) and estimating clean parameters from the estimated noise and the estimated model parameters using a clean parameter estimation module (210).

According to another embodiment of the invention, the invention proposes to estimate the clean models, given the noisy model and an estimate of the prevalent noise during the training phase. The clean models estimated by the present invention can be used in the speaker or speech recognition systems in the place of the noisy models to obtain better performance.

According to another embodiment of the invention, the speech acquisition module (202) features a microphone to acquire the speech utterances. It would also contain an analog-to-digital converter to convert the analog speech signal acquired through the microphone to digital waveform.

According to another embodiment of the invention, the noise estimation module (204) estimates the prevalent noise during the training phase. One way of estimating the noise is by having a separate microphone for noise capture, which is kept some distance away from the speaker. Noise can also be estimated though the non-speech frames of the speech signal captured in the speech acquisition module (202).

According to another embodiment of the invention, in the feature extraction module (206), the digital waveform from the speech acquisition module (202) acts as the input for this module. Non speech portion maybe removed from the digital waveform. This module computes the feature from the speech signal. In an exemplary embodiment of the invention, Mel-Frequency Cepstral Coefficients (MFCC) has been used as the speech feature, in which case the feature extraction module (206) computes the Mel-Frequency Cepstral Coefficients (MFCC) from the digital waveform. Although Mel-Frequency Cepstral Coefficients (MFCCs) have been used as the speech features, the present invention is applicable to any speech features that is derived from the spectrum of the speech signal.

According to another embodiment of the invention, in the parameter estimation module (208), the features computed by the feature extraction module (206) acts as the input into the parameter estimation module (208). This module estimates the model parameters given in the training speech. In an embodiment, this module implements the Expectation Maximization (EM) algorithm to compute the model parameters.

According to another embodiment of the invention, the inputs to the clean parameter estimation module (210) are the estimated noise from the noise estimation module (204) and the parameters from the parameter estimation module (208). If the noise and the parameters are not in the spectral domain, then the clean parameter estimation module (210) first converts the noise and the model parameters to their spectral domain representations. In an exemplary embodiment, if the model mean is in MFCC domain, then it can be converted to spectral domain by multiplying with Inverse Discrete Cosine Transformation (IDCT) matrix and then taking the exponential. After the conversion to spectral domain, the clean parameters are estimated by a Reverse Psychoacoustic Compensation (RPC) process. The Reverse Psychoacoustic Compensation (RPC) process is implemented by the following method:

Suppose, for a particular frequency bin f, the estimated noise is $\{n_{f1}, n_{f2}, \ldots, n_{fT}\}$ and a model mean value is $\mu_f$ in the spectral domain. It should be noted that the model mean $\mu_f$ is the noisy parameter. Let the clean model mean be denoted as $m_f$. The estimation of $m_f$ is accomplished iteratively in the following process:

1. Initialize $m_f$ to a certain value. It may be preferable to initialize it to a low value like $0.1\mu_f$.
2. Perform Psychoacoustic Compensation on the $m_f$ using the estimated noise to obtain $\overline{m}_f$. The $\overline{m}_f$ can be obtained by the following equations:

$$h = 13.\arctan(0.00076.h_f) + 3.5.\arctan\left[\left(\frac{h_f}{7500}\right)^2\right] \quad (1)$$

In the equation above, $h_f$ is the hertz value of the frequency bin f.

$$\theta_f^s = 20\log_{10}(m_f) - 0.275.h - 6.025 \quad (2)$$

$$\theta_{ft}^n = 20\log_{10}(n_{ft}) - 0.175.h - 2.025 \quad (3)$$

$$\overline{m}_{ft} = \begin{cases} m_f & \text{if } 10^{\theta_f^s/20} > n_{ft} \\ n_{ft} & \text{if } 10^{\theta_{ft}^n/20} > m_f \\ m_f + n_{ft} - 10^{\theta_f^s/20} & \text{if State } I \\ m_f + n_{ft} - 10^{\theta_{ft}^n/20} & \text{otherwise} \end{cases} \quad (4)$$

In the equation above, the State I refers to the following:

$$m_f = 10^{\theta_{ft}^n/20} > n_{ft} - 10^{\theta_f^s/20}. \quad (5)$$

$$\overline{m}_f = \frac{1}{T}\sum_{t=1}^{T}\overline{m}_{ft}$$

3. If the value of $\overline{m}_f$ is within a certain range of $\mu_f$, then the iteration stops and the clean estimate of the model mean is taken as $m_f$. The range can be specified as per one's requirement of the accuracy. For example, the range be $0.001\mu_f$. If the value of $\overline{m}_f$ is not specified range of $\mu_f$, then update the clean estimate of the model mean $m_f$ as follows:

$$m_f = \begin{cases} m_f + \delta & \text{if } \mu_f > \overline{m}_f \\ m_f - \delta & \text{if } \mu_f < \overline{m}_f \end{cases} \quad (6)$$

The $\delta$ can be specified to be small value as requirement. For example, $\delta$ can be $0.1|\mu_f - \overline{m}_f|$.

After the update of $m_f$, go back to step 2. In order to make the whole process faster, a limit on maximum number of iterations can also be placed.

The clean parameter estimated as above is the spectral representation of the estimated clean model mean. It can be converted to a domain as required by the speech or speaker recognition system. For example, if the clean model mean is required in MFCC domain, then the spectral representation can be converted to MFCC domain by taking logarithm and then multiplying with Discrete Cosine Transformation (DCT) matrix. This converted model is stored and is used in the recognition phase for better accuracy.

According to another embodiment of the invention, in case many instances of the clean model parameters are realized from the same noisy model by varying the estimated noise, the best model can be used in the recognition phase. The best model can be judged by putting some criteria such as the model with highest match score given a test utterance. Another way to employ multiple clean models will be to compute the match score with each of the clean model and then calculating the average match score, which will be used for the recognition purpose.

According to another embodiment of the invention, by varying the estimated noise, for example by scaling the noise up or down, many instances of clean model parameters can be arrived at from a single noisy model parameter.

What is claimed is:

1. A method of estimating clean speech parameters from noisy speech parameters, said method comprising processor implemented steps of:
   acquiring speech signals using a speech acquisition module (202);
   estimating noise from said acquired speech signals using a noise estimation module (204), wherein estimation of noise is performed through non-speech frames of the acquired speech signals;
   computing noisy speech features from said estimated noise using a feature extraction module (206), wherein Mel-Frequency Cepstral Coefficients are used as said noisy speech features;
   estimating noisy model parameters from said computed noisy speech features using a parameter estimation module (208); and
   estimating clean parameters from said estimated noise and said estimated noisy model parameters using a clean parameter estimation module (210), wherein the estimation is performed using Reverse Psychoacoustic Compensation (RPC),
   wherein the RPC is performed iteratively by:
      initializing a clean model mean to a certain value of a model mean;
      performing Psychoacoustic Compensation on the initialized clean model mean to obtain a compensated clean model mean;
      determining if value of the compensated clean model mean is within a certain range of a model mean value;
      terminating the iteration in response to determining that the value of the compensated clean model mean is within a certain range of the model mean value; and
      updating clean parameters of the clean model mean in response to determining that the value of the compensated clean model mean is outside a certain range of the model mean value.

2. The method as claimed in claim 1, wherein said speech acquisition module (202) further converts said acquired speech signals from analog to digital waveforms.

3. The method as claimed in claim 1, wherein said estimation of noise using the noise estimation module is performed during training phase.

4. The method as claimed in claim 1, wherein said estimated noise and said estimated noisy model parameters are first converted into their spectral domain representations.

5. The method as claimed in claim 1, wherein the estimated clean parameters are in their spectral domain representation.

6. The method as claimed in claim 5, wherein the estimated clean parameters are converted from their spectral domain representation to feature domain representation.

7. A system of estimating clean speech parameters from noisy speech parameters, said system comprising:

a processor;
a data bus coupled to said processor; and
a computer-usable medium embodying computer code, said computer-usable medium being coupled to said data bus, said computer program code comprising instructions executable by said processor and configured for:
acquiring speech signals;
estimating noise from said acquired speech signals, wherein estimation of noise can be performed through non-speech frames of the acquired speech signals;
computing noisy speech features from said estimated noise, wherein Mel-Frequency Cepstral Coefficients are used as said noisy speech features;
estimating noisy model parameters from said computed noisy speech features;
estimating clean parameters from said estimated noise and said estimated noisy model parameters, wherein the estimation is performed using reverse psychoacoustic compensation (RPC), wherein the RPC is performed iteratively by:
initializing a clean model mean to a certain value of a model mean;
performing Psychoacoustic Compensation on the initialized clean model mean to obtain a compensated clean model mean;
determining if value of the compensated clean model mean is within a certain range of a model mean value;
terminating the iteration in response to determining that the value of the compensated clean model mean is within a certain range of the model mean value; and
updating clean parameters of the clean model mean in response to determining that the value of the compensated clean model mean is outside a certain range of the model mean value.

8. One or more non-transitory machine readable information storage mediums comprising one or more instructions which when executed by one or more hardware processors causes:
acquiring of speech signals using a speech acquisition module (202);
estimating of noise from said acquired speech signals using a noise estimation module (204), wherein estimation of noise can be performed through non-speech frames of the acquired speech signals;
computing of noisy speech features from said acquired speech signals using a feature extraction module (206), wherein Mel-Frequency Cepstral Coefficients are used as said noisy speech features;
estimating of noisy model parameters from said computed noisy speech features using a parameter estimation module (208);
estimating of clean parameters from said estimated noise and said estimated noisy model parameters using a clean parameter estimation module (210), wherein the estimation is performed using reverse psychoacoustic compensation (RPC), wherein the RPC is performed iteratively by:
initializing a clean model mean to a certain value of a model mean;
performing Psychoacoustic Compensation on the initialized clean model mean to obtain a compensated clean model mean;
determining if value of the compensated clean model mean is within a certain range of a model mean value;
terminating the iteration in response to determining that the value of the compensated clean model mean is within a certain range of the model mean value; and
updating clean parameters of the clean model mean in response to determining that the value of the compensated clean model mean is outside a certain range of the model mean value.

9. The one or more non-transitory machine readable information storage mediums of claim 8, wherein said speech acquisition module (202) further converts said acquired speech signals from analog to digital waveforms.

10. The one or more non-transitory machine readable information storage mediums of claim 8, wherein said estimation of noise using the noise estimation module is performed during training phase.

11. The one or more non-transitory machine readable information storage mediums of claim 8, wherein said estimated noise and said estimated noisy model parameters are first converted into their spectral domain representations.

12. The one or more non-transitory machine readable information storage mediums of claim 8, wherein the estimated clean parameters are in their spectral domain representation.

13. The one or more non-transitory machine readable information storage mediums of claim 12, wherein the estimated clean parameters are converted from their spectral domain representation to feature domain representation.

* * * * *